US012542994B2

United States Patent
Price et al.

(10) Patent No.: US 12,542,994 B2
(45) Date of Patent: Feb. 3, 2026

(54) FORCE-CANCELLING AUDIO SYSTEM INCLUDING AN ISOBARIC SPEAKER CONFIGURATION WITH SPEAKER MEMBRANES MOVING IN OPPOSITE DIRECTIONS

(71) Applicant: Meta Platforms Technologies, LLC, Menlo Park, CA (US)

(72) Inventors: Rex Pinegar Price, Cameron Park, CA (US); Alan Ng, Seattle, WA (US); Calvin Bernard Shaw, Milpitas, CA (US); Peter Mikael Mogren, Seattle, WA (US); Caroline Whelan, Seattle, WA (US); Trang Fisher, San Jose, CA (US); MohanRaj Manoharan, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 649 days.

(21) Appl. No.: 18/085,370

(22) Filed: Dec. 20, 2022

(65) Prior Publication Data

US 2024/0073589 A1 Feb. 29, 2024

Related U.S. Application Data

(60) Provisional application No. 63/401,528, filed on Aug. 26, 2022.

(51) Int. Cl.

| | |
|---|---|
| ***H04R 1/10*** | (2006.01) |
| ***H04R 1/02*** | (2006.01) |
| ***H04R 1/22*** | (2006.01) |
| ***H04R 1/28*** | (2006.01) |
| ***H04R 9/02*** | (2006.01) |
| ***H04R 9/06*** | (2006.01) |

(52) U.S. Cl.

CPC .......... *H04R 1/2826* (2013.01); *H04R 1/028* (2013.01); *H04R 1/1008* (2013.01); *H04R 1/1075* (2013.01); *H04R 1/227* (2013.01); *H04R 9/025* (2013.01); *H04R 9/06* (2013.01); *H04R 2499/15* (2013.01)

(58) Field of Classification Search

CPC .... H04R 1/2826; H04R 1/028; H04R 1/1008; H04R 1/1075; H04R 1/227; H04R 9/025; H04R 9/06; H04R 2499/15; H04R 1/34; H04R 2209/026; H04R 1/2873; H04S 7/304

USPC .................. 381/89, 335, 345, 351, 337–339

See application file for complete search history.

(56) References Cited

U.S. PATENT DOCUMENTS 6,363,157 B1 * 3/2002 Chick ...................... H04R 1/26 381/89
6,816,598 B1 * 11/2004 Budge ...................... H04R 3/12 381/89

(Continued)

*Primary Examiner* — Xu Mei
(74) *Attorney, Agent, or Firm* — Greenberg Traurig, LLP

(57) ABSTRACT

An audio device includes a first speaker and a second speaker. A front surface of a membrane of the second speaker faces a rear surface of a membrane of the first speaker. The membrane of the first speaker moves in an opposite direction than the membrane of the second speaker when the audio device outputs audio content. This configuration maintains isobaric pressure for a back volume shared between the first speaker and the second speaker, reducing vibration of the audio device when outputting audio content.

20 Claims, 11 Drawing Sheets

(56) References Cited

U.S. PATENT DOCUMENTS

| | | | | |
|---|---|---|---|---|
| 7,567,680 | B2 * | 7/2009 | Murray | H04R 1/225<br>381/396 |
| 8,509,455 | B2 * | 8/2013 | Gregg | H04R 1/02<br>381/98 |
| 11,451,902 | B1 * | 9/2022 | Leonhardt | H04R 1/2888 |
| 12,160,703 | B1 * | 12/2024 | Price | H04R 1/1041 |
| 2004/0131202 | A1 * | 7/2004 | Cranfill | H04M 1/035<br>381/89 |
| 2014/0314249 | A1 * | 10/2014 | Fincham | H04R 1/403<br>381/89 |

* cited by examiner

FORCE-CANCELLING AUDIO SYSTEM INCLUDING AN ISOBARIC SPEAKER CONFIGURATION WITH SPEAKER MEMBRANES MOVING IN OPPOSITE DIRECTIONS

CROSS-REFERENCE TO RELATED APPLICATIONS

This application claims the benefit of U.S. Provisional Application No. 63/401,528, filed Aug. 26, 2022, which is incorporated by reference in its entirety.

FIELD OF THE INVENTION

This disclosure relates generally to artificial reality systems, and more specifically to an audio system for artificial reality systems including isobaric speakers for force cancellation.

BACKGROUND

When a speaker is mounted on a wearable device, such as an augmented reality (AR) headset or a virtual reality (VR) headset, the speaker may generate vibration to the device when playing audio content. This vibration causes unwanted shaking and contamination to signals used by the wearable device. For example, an AR or VR headset includes an inertial measurement unit (IMU) that tracks movement of a user's body or head when using the AR or VR headset. Vibration from a speaker playing audio content introduces error into signals generated by the IMU, resulting in inaccurate determination of a user's body or head movement. The inaccuracies introduced into the IMU signals are difficult to correct without impairing audio output by a speaker or introducing delays into signal generation by the IMU. Additionally, audio leakage from a wearable device may also be undesirable, as such leakage reduces a user's privacy by allowing audio content to be heard by parties other than the user. Existing speakers that are manufactured for improved low-frequency (i.e., bass) performance result in increased vibration from the speakers and increased audio leakage from the speakers, making such speakers unsuitable for many wearable device applications.

SUMMARY

A speaker generates sound through the movement of a membrane including a front surface and a back surface. When the speaker is mounted on a wearable device such as a virtual reality (VR) headset or artificial reality (AR) glasses, sound waves generated from movement of the speaker's diaphragm may generate vibrations of the wearable device that are detected by an inertial measurement unit (IMU) of the wearable device. These detected vibrations (also referred to as contamination signals) may cause motion tracking of the wearable device to fail.

To eliminate these contamination signals, an audio device includes a first membrane including a first front surface and a first back surface. The audio device also includes a second membrane including a second front surface and a second back surface, with the second front surface facing toward the first back surface. Further, the audio device has a first front volume that includes a first port and is formed in part by the first front surface and is configured to output first acoustic pressure waves generated by the first membrane via the first port. Additionally, the audio device includes a second front volume having a second port that is formed in part by the second front surface and is configured to output acoustic pressure waves generated by the second membrane via the second port. The audio device further includes a shared back volume that is formed in part by the first back surface and the second back surface, with pressure within the shared back volume configured to be isobaric.

Additionally, a headset includes a frame and one or more display elements coupled to the frame, with each display element configured to generate image light. The headset includes an audio device in a portion of the frame. The audio device includes a first membrane including a first front surface and a first back surface. The audio device also includes a second membrane including a second front surface and a second back surface, with the second front surface facing toward the first back surface. Further, the audio device has a first front volume that includes a first port and is formed in part by the first front surface and is configured to output first acoustic pressure waves generated by the first membrane via the first port. Additionally, the audio device includes a second front volume having a second port that is formed in part by the second front surface and is configured to output acoustic pressure waves generated by the second membrane via the second port. The audio device further includes a shared back volume that is formed in part by the first back surface and the second back surface, with pressure within the shared back volume configured to be isobaric.

In other embodiments, an audio device includes a first membrane including a first front surface and a first back surface and a second membrane including a second front surface and a second back surface. The second front surface faces away from the first back surface so the first front surface and the second front surface face opposite directions. The audio device also includes a first port in a volume formed by the first front surface of the first membrane and the second front surface of the second membrane, with the first port configured to output acoustic pressure waves generated by movement of the first membrane and the second membrane (e.g., movement of the first and second front surfaces). Additionally, the audio device includes a second port in a back volume formed by the first back surface of the first membrane and the second back surface of the second membrane and aligned with the first port along an axis perpendicular to the first port and the second port, with the second port configured to output acoustic pressure waves generated by movement of the first membrane and the second membrane (e.g., movement of the first and second back surfaces).

Figure 1A:
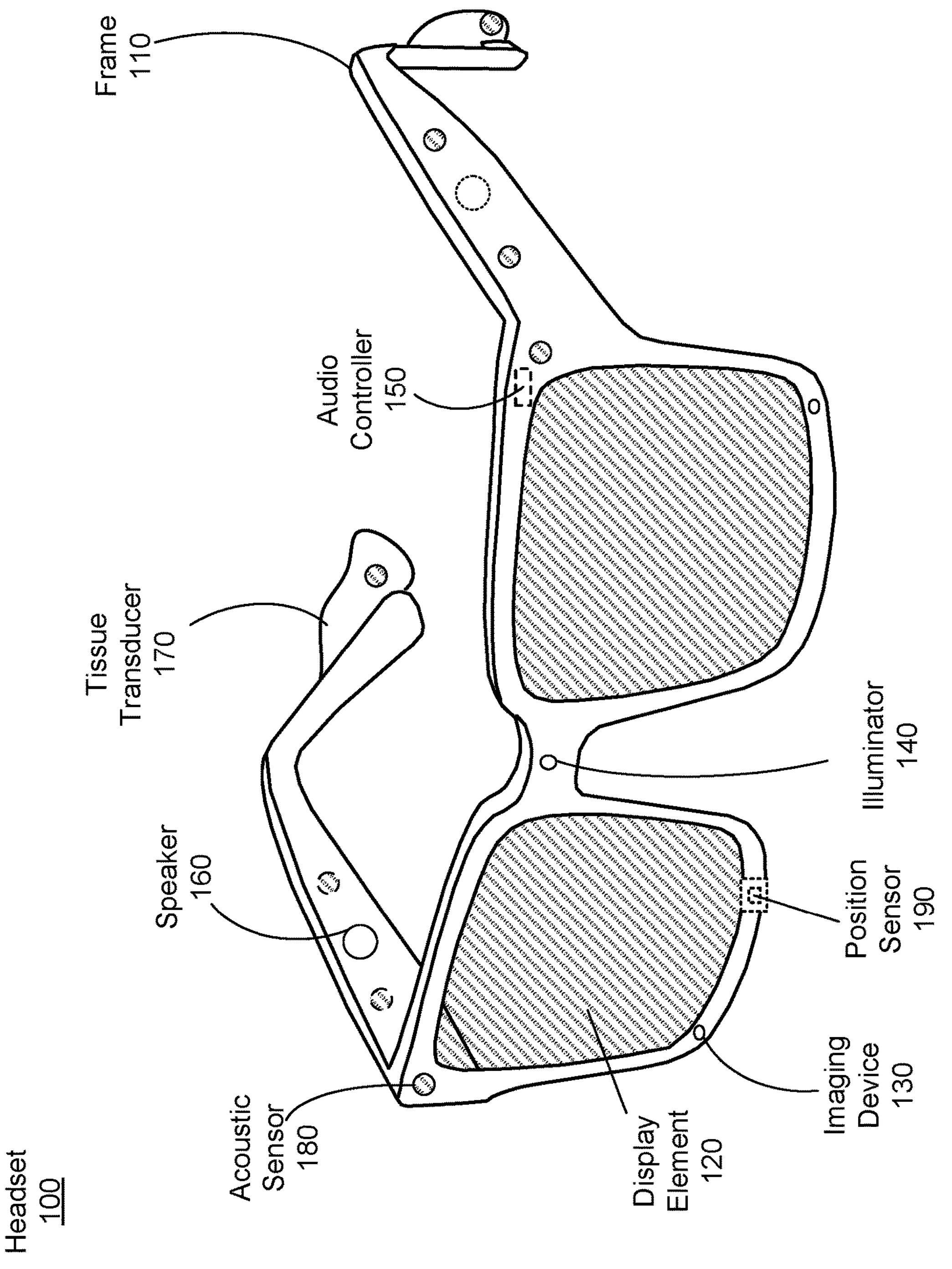
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A speaker generates sound through the movement of a membrane. When the speaker is mounted on a wearable device such as a virtual reality (VR) headset or artificial reality (AR) headset, sound waves generated from movement of the speaker's diaphragm generate vibrations of the wearable device that are detected by an inertial measurement unit (IMU) of the wearable device. These detected vibrations (also referred to as contamination signals) may cause motion tracking of the wearable device to fail.

Because of nonlinear, non-quantified gyroscope responses to vibrations in an audio frequency range, contamination signals generated by a speaker cannot readily be removed through processing techniques. In some configurations, a high pass filter is added to a speaker to mitigate contamination signals generated by the speaker. However, inclusion of the high-pass filter reduces low-frequency (e.g., bass) output by the speaker, impairing audio content played for a user through the speaker. Other configurations include a peaking filter on the IMU of the wearable device to mitigate contamination signals from the speaker. However, inclusion of the peaking filter introduces a delay in receipt of signals by the IMU, with this delay reducing accuracy of the IMU in tracking movement of a user's head or body by introducing swim or drift issues.

To mitigate vibrations when a speaker plays audio content, an audio device includes a first speaker and a second speaker. The second speaker is aligned behind the first speaker, so a second front surface of a second membrane of the second speaker faces a first back surface of a first membrane of the first speaker. This alignment of the first speaker and the second speaker creates a shared back volume for the first speaker and the second speaker that is formed in part by a first back surface of the first membrane and the second back surface of the second membrane. This back volume is shared by the first speaker and the second speaker. The first speaker and the second speaker are configured so their respective membranes move in opposite directions, causing a pressure in the shared back volume to remain constant, or to remain within a threshold amount of a starting pressure. This causes the pressure in the shared volume to be isobaric, or substantially isobaric, allowing the shared back volume of the first speaker and the second speaker to act as an infinite baffle when the first membrane and the second membrane move in opposite directions, which cancels force generated from movement of the first membrane and the second membrane. The shared back volume removes contamination signals generated when the speaker outputs audio content without impairing low-frequency performance of the speaker or introducing a delay in receipt of data by an IU.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound or audio content to a user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

In various embodiments described herein, such as in conjunction with FIGS. 3-9, a transducer may be an audio device that includes multiple speakers. Description herein of an audio device may refer to an audio device positioned on a left side of the frame 110 or on the right side of the frame 110. In various embodiments, a configuration of an audio device is substantially identical on the left side and on the right side of the frame 110, except mirrored, to direct audio content towards the direction of a user's ears. As further described herein, an audio device includes one or more speakers along with one or more ports, with the ports directing audio output produced by one or more speakers towards a user wearing the headset 100 or away from the user wearing the headset 100 and into a local area surrounding the headset 100.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 10.

When a speaker 160 plays audio content to a user, a membrane included in the speaker moves back and forth to generate acoustic pressure waves that are output via one or more ports. The acoustic pressure waves comprise the audio content that is audibly presented to a user. However, movement of the membrane generates vibrations of the frame 110 that are detected by the position sensor 190 of the frame 100. These detected vibrations (also referred to as contamination signals) may cause motion tracking of the frame 110 to fail or to be inaccurate. To mitigate vibrations generated when audio content is presented to a user, FIGS. 3-9 describe various embodiments of an audio device including a plurality of speakers that are oriented relative to each other so vibrations from movement of a membrane of one speaker cancel vibrations from movement of a membrane of another speaker. In various embodiments, the audio device includes multiple speakers having an isobaric configuration, where membranes of different speakers move in opposing directions to maintain a constant (or a substantially constant) pressure of a back volume shared between multiple speakers. Such a configuration attenuates vibration from the audio device when playing audio content, preventing presentation of audio content from affecting measurement signals generated by the position sensor 190.

Figure 1B:
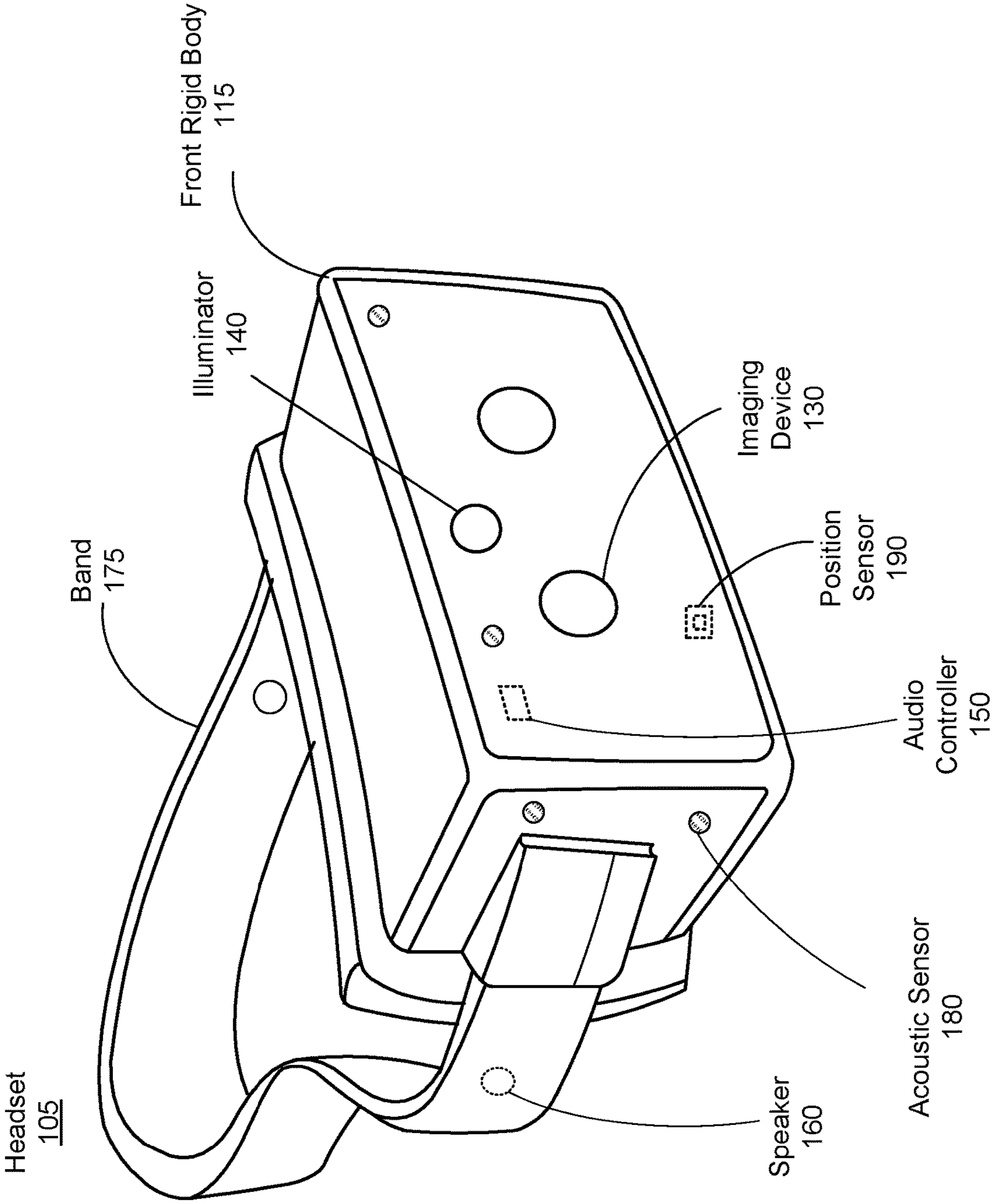
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
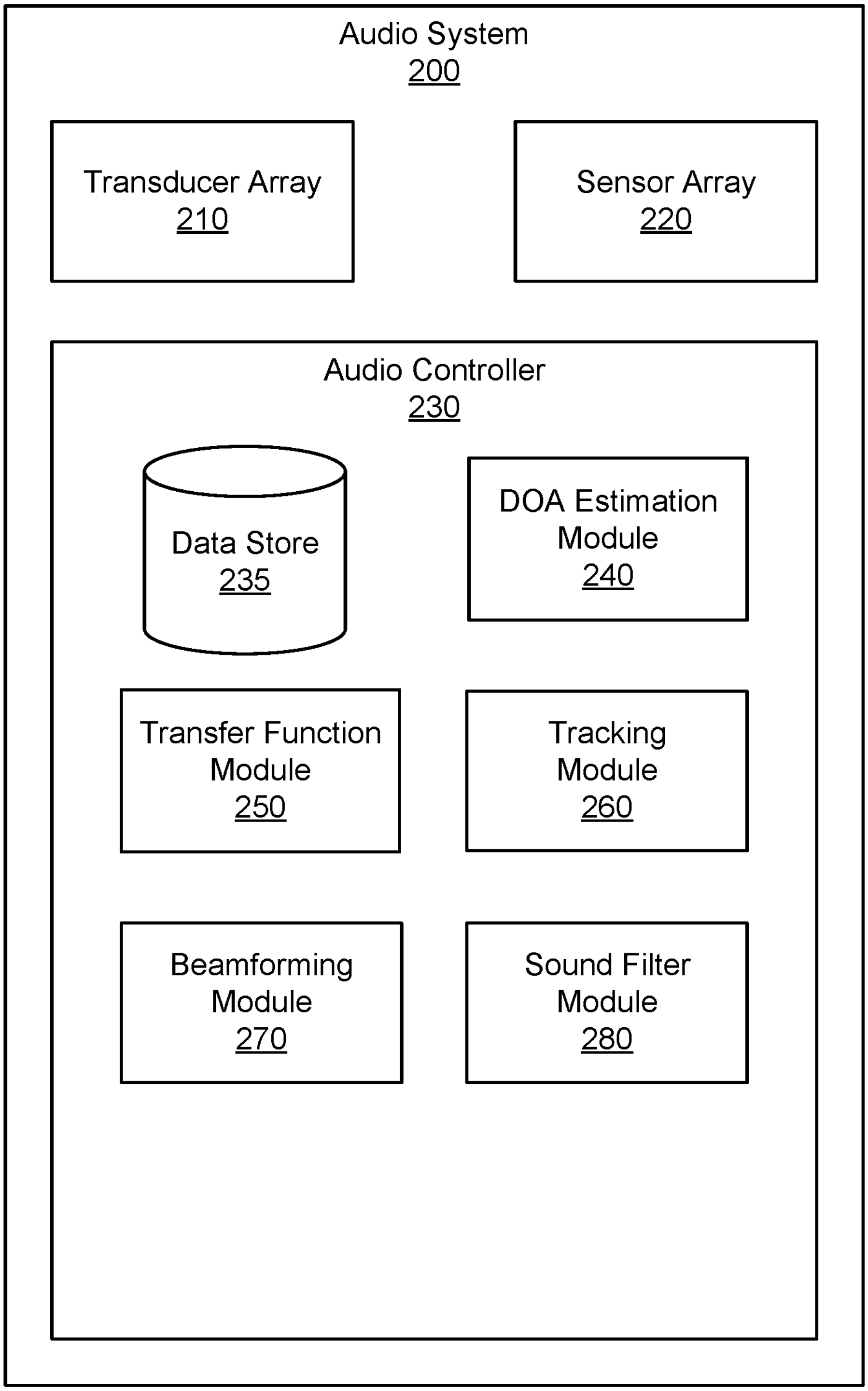
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range. In various embodiments described herein, such as in conjunction with FIGS. 3-9, a transducer of the transducer array 210 may be an audio device that includes multiple speakers.

The bone conduction transducers generate acoustic pressure waves by vibrating bone/tissue in the user's head. A bone conduction transducer may be coupled to a portion of a headset and may be configured to be behind the auricle coupled to a portion of the user's skull. The bone conduction transducer receives vibration instructions from the audio controller 230 and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 10).

The sound filter module 280 provides the sound filters to the transducer array 210. In some embodiments, the sound filters may cause positive or negative amplification of sounds as a function of frequency.

Figure 3:
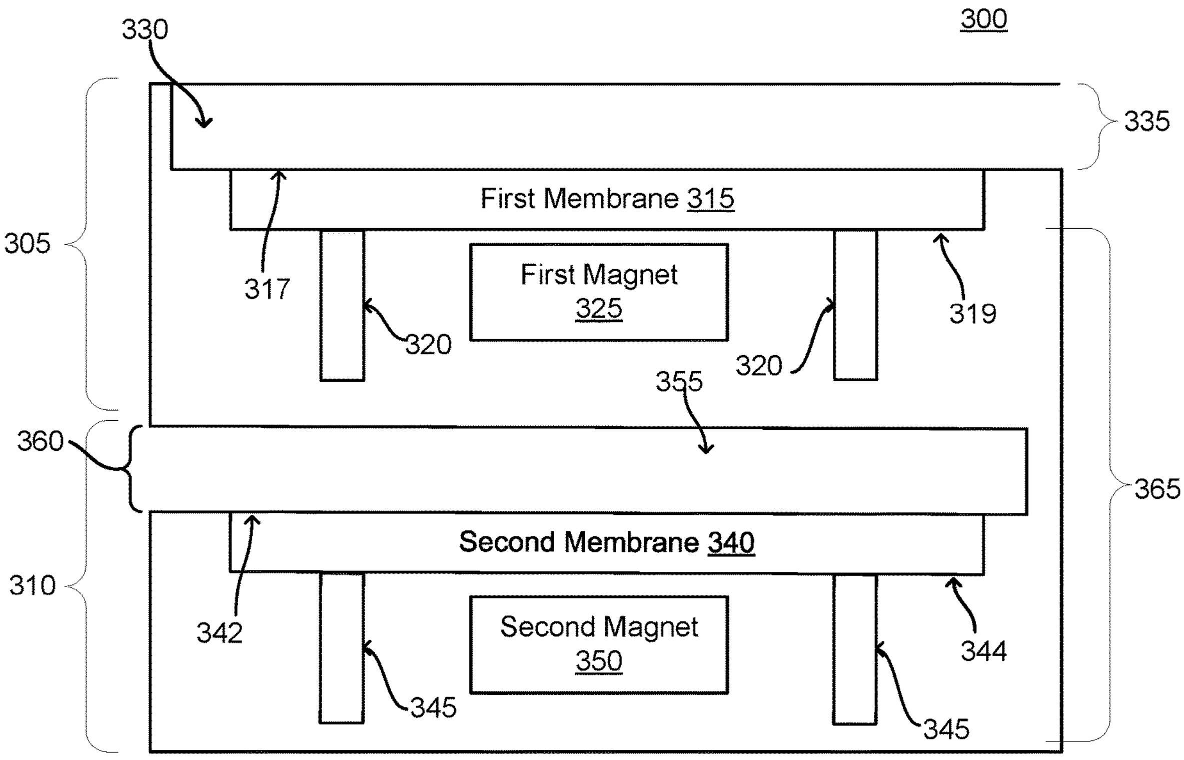
FIG. 3 is a cross-sectional view of one embodiment of an audio device including a plurality of speakers, in accordance with one or more embodiments.

As further described above in conjunction with FIGS. 1A-1B, a headset 100 includes one or more speakers 160. In some embodiments, the headset 100 includes an audio device 300 including a plurality of speakers. FIG. 3 is a cross-sectional view of one embodiment of an audio device 300 including a plurality of speakers. In the embodiment shown by FIG. 3, the audio device 300 includes a first speaker 305 and a second speaker 310. The audio device 300 receives signals from a component, such as a console 1015, further described below in conjunction with FIG. 10, and generates audio output based on the received signals.

The first speaker 305 includes a first membrane 315 having a first front surface 317 and a first back surface 319. The first front surface 317 is opposite the first back surface 319. In various embodiments, the first front surface 317 is parallel to the first back surface 319. The first membrane 315 is a thin, semi-rigid material in various embodiments.

One or more voice coils 320 are coupled to the first back surface 319 of the first membrane 315. A voice coil 320 is a coil of wire configured to receive current. In various embodiments, current received by the voice coil 320 is based on a signal including audio content to be played for a user. As the current passes through the coil of wire, a magnetic field is produced. The magnetic field produced by the voice coil 320 reacts with a magnetic field from a first magnet 325 positioned proximate to the first membrane 315. The first magnet 325 is a permanent magnet in various embodiments. The first membrane 315 moves in response to the reaction between the magnetic field produced by the voice coil 320 and the magnetic field of the first magnet 325. For example, the first membrane 315 moves away from the first magnet 325 when the magnetic field from the first magnet 325 repels a magnetic field generated by the voice coil 320, while the first membrane 315 moves towards the first magnet 325 when the magnetic field from the first magnet 325 attracts the magnetic field generated by the voice coil 320.

Additionally, a first front volume 330 is formed in part by the first front surface 317 of the first membrane 315. Movement of the first membrane 315 generates acoustic pressure waves in the first front volume 330. For example, the first front surface 317 is a side of the first front volume 330, while additional sides of the first front volume 330 are formed by another material, such as a portion of a headset 100 or of a housing including the first speaker 305 and the second speaker 310. An additional side of the first front volume 330 is opposite to the first front surface 317 of the first membrane 315. In some embodiments, the additional side is parallel to the first front surface 317 of the first membrane 315 when the first membrane 315 is not moving. The first front volume 330 acts as a waveguide for acoustic pressure waves formed by movement of the first membrane 315, as further described above. In the embodiment shown in FIG. 3, the first front volume 330 includes a first port 335, with the first front volume 330 configured to direct acoustic pressure waves generated by the first membrane 315 to the first port 335. For example, the first port 335 is an opening in a portion of a headset 100 or of another wearable device, and the first front volume 330 directs acoustic pressure waves to the first port 335 to be output from the headset 100 or the other wearable device. In some embodiments, the first port 335 is at a first end of the first front volume 330, while a second end of the first front volume 330 that is opposite to the first port 335 is sealed. The preceding configuration allows the first front volume 330 to direct acoustic pressure waves generated by the first membrane 315 to the first port 335.

The second speaker 310 includes a second membrane 340 having a second front surface 342 and a second back surface 344. The second front surface 342 is opposite the second back surface 344. In various embodiments, the second front surface 342 is parallel to the second back surface 344. The second membrane 340 is a thin, semi-rigid material in various embodiments. The second front surface 342 of the second membrane 340 faces towards the first back surface 319 of the first membrane 315. This orientation of the second front surface 342 relative to the first back surface 319 of the first membrane 315 causes the second front surface 342 and the first front surface 317 to face in a common direction.

One or more voice coils 345 are coupled to the second back surface 344 of the second membrane 340. As further described above, a voice coil 345 receives current based on a signal including audio content to be played for a user and generates a magnetic field as the current passes through the coil of wire. The magnetic field produced by the voice coil 345 reacts with a magnetic field from a second magnet 350 positioned proximate to the second membrane 340. The second magnet 350 is a permanent magnet in various embodiments. The second membrane 340 moves in response to the reaction between the magnetic field produced by the voice coil 345 and the magnetic field of the second magnet 350. For example, the voice coil 345 moves because of the Laplace force acting on the voice coil 345 when current is passed through the voice coil 345 and the voice coil 345 is in the magnetic field of the second magnet 350.

The second front surface 342 of the second membrane 340 also forms a part of a second front volume 355 where acoustic pressure waves from movement of the second membrane 340 are formed. The second front surface 342 is a side of the second front volume 355, while additional sides of the second front volume 355 may be formed by another material, such as a portion of a headset 100 or of a housing including the first speaker 305 and the second speaker 310 in some embodiments. An additional side of the second front volume 355 is opposite to the second front surface 342 of the second membrane 340. In some embodiments, the additional side is parallel to the second front surface 342 of the second membrane 340 when the second membrane 340 is at rest. The second front volume 355 acts as a waveguide for acoustic pressure waves formed by movement of the second membrane 340, as further described above. In the embodiment shown in FIG. 3, the second front volume 355 includes a second port 360, with the second front volume 355 configured to direct acoustic pressure waves generated by the second membrane 340 to the second port 360. For example, the second port 360 is an opening in a portion of a headset 100 or of another wearable device, and the second front volume 355 directs acoustic pressure waves to the second port 360 to be output from the headset 100 or the other wearable device. In some embodiments, the second port 360 is at a first end of the second front volume 355, while a second end of the second front volume 355 that is opposite to the second port 360 is sealed, so the second front volume 355 directs acoustic pressure waves generated by the second membrane 340 to the second port 360.

Orienting the second speaker 310 so the second front surface 342 of the second membrane 340 faces the first back surface 319 of the first membrane 315, as shown by FIG. 3, forms a shared back volume 365 for the first speaker 305 and the second speaker 310. The shared back volume 365 is formed in part by the first back surface 319 of the first membrane 315 and the second back surface 344 of the second membrane 340. For example, the first back surface 319 of the first membrane 315 is a first side of the shared back volume 365 and the second back surface 344 of the second membrane 340 is a second side of the shared back volume 635. A pressure within the shared back volume 365 is isobaric, or substantially isobaric. For the pressure of the shared back volume 365 to be isobaric, the pressure of the shared back volume 365 remains constant (or within a threshold amount of a constant pressure).

In FIG. 3, the shared back volume 365 is formed by an opening between the second front volume 355 and the right side of the housing. However, this is not required. In other embodiments, the shared back volume 365 can be formed by other component geometries. For example, the housing may extend along an axis perpendicular to the cross-sectional view of FIG. 3 farther than the second front volume 355, resulting in an opening that forms the shared back volume 365. These statements regarding the formation of the shared back volume also apply to FIGS. 4-9. For example, in FIG. 5, the shared back volume 365 is also formed by an opening between the second front volume 355 and the right side of the housing. However, in FIG. 7 the shared back volume 365 is formed by one or more openings not illustrated (e.g., the shared back volume 365 is formed by the housing extending along an axis perpendicular to the cross-sectional view farther than the second front volume 355).

The shared back volume 365 is sealed and connects the first speaker 305 and the second speaker 310. For example, the shared back volume 365 is enclosed by a housing, such as a frame 110 of a headset 100, including the audio device 300. The pressure of the shared back volume 365 is affected by movement of the first membrane 315 and of the second membrane 340. For example, when the first membrane 315 moves towards the first magnet 325, pressure of the shared back volume 365 increases. Similarly, when the first membrane 315 moves away from the first magnet 325, pressure of the shared back volume 365 decreases. To maintain isobaric, or substantially isobaric, pressure within the shared back volume 365, the first membrane 315 and the second membrane 340 move in opposite directions.

Figure 4:
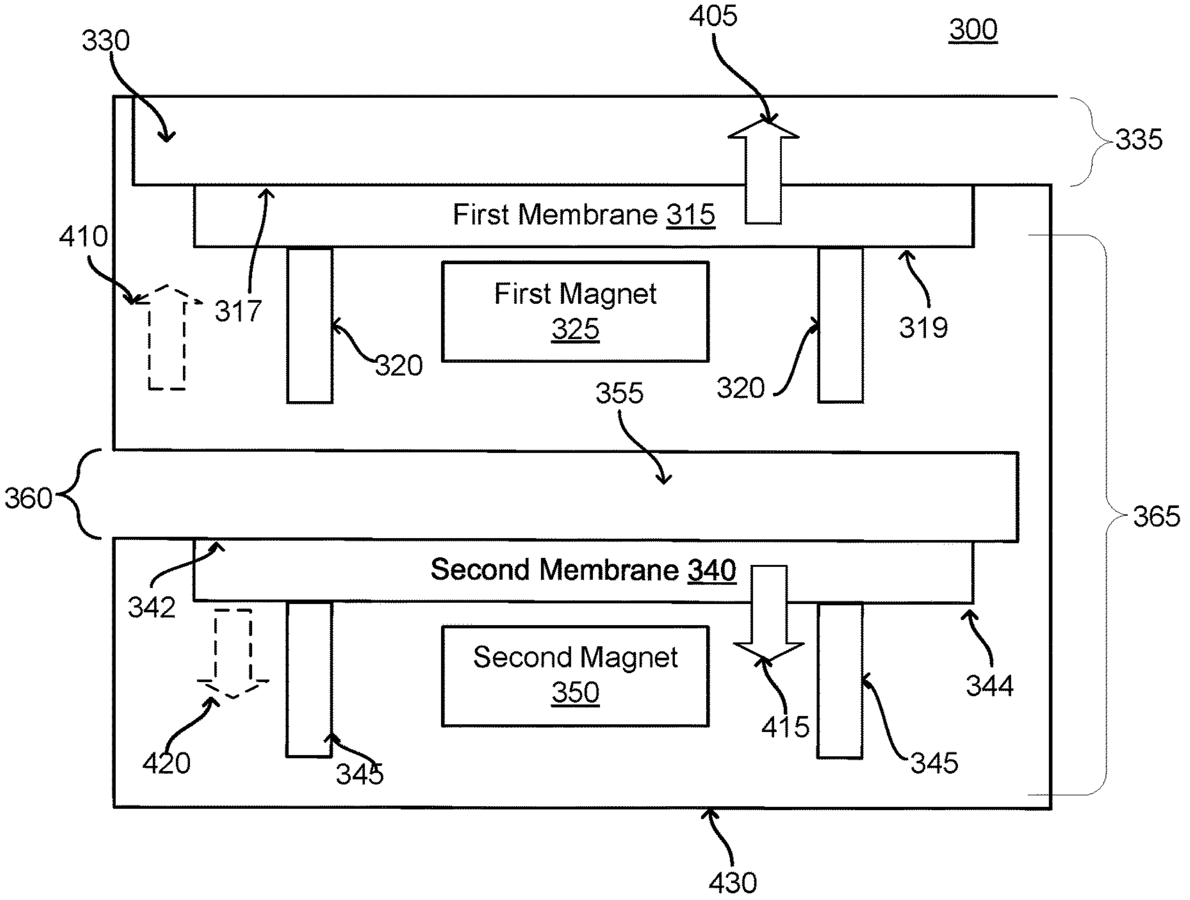
FIG. 4 is a conceptual diagram of movement of a first membrane and a second membrane of an audio device, in accordance with one or more embodiments.

Referring to FIG. 4, a conceptual diagram of movement of the first membrane 315 and the second membrane 340 is shown. In the example of FIG. 4, the first membrane 315 moves 405 away from the first magnet 325, causing the first back surface 319 of the first membrane 315 to move 410 away from a surface of the second front volume 355, which decreases pressure in the shared back volume 365. To offset the pressure decrease in the shared back volume 365 from movement of the first membrane 315, the second membrane 340 moves 415 towards the second magnet 325, as shown in FIG. 4. Movement of the second membrane 340 towards the second magnet 325 causes the second back surface 344 of the second membrane 340 to move 420 into the shared back volume 365. Movement of the second back surface 344 into the shared back volume 365 compresses air in the shared back volume 365 against a housing 430 including the audio system 300, which increases pressure in the shared back volume 365. The pressure increase from the second back surface 344 moving into the shared back volume 365 offsets the decrease in pressure from movement of the first back surface 319 away from the first magnet 325. Hence, having the first membrane 315 and the second membrane 340 move in opposite directions offsets a pressure change within the shared back volume 365 caused by movement of one of the first membrane 315 and the second membrane 340.

Maintaining constant pressure (or maintaining pressure within a threshold amount of a specific pressure) allows the shared back volume 365 to act as a baffle. When the first membrane 315 and the second membrane 340 move in opposite directions, movement of the first membrane 315 offsets a pressure change of the shared back volume 365 that would have resulted from movement of the second membrane 340 and vice versa, so the shared back volume 365 has an isobaric pressure. Having an isobaric pressure in the shared back volume 365 from opposing movement of the first membrane 315 and the second membrane 340 allows the audio device 300 to use a small, sealed back volume 365 that does not introduce stiffness to the audio device 300 that would otherwise compromise audio performance of a small, sealed box speaker design.

Referring back to FIG. 3, the first port 335 and the second port 360 face opposite directions in various embodiments. For example, the first port 335 faces a first direction, and the second port 360 faces a second direction that is opposite the first direction (e.g., the second direction is oriented 180 degrees relative to the first direction). Having the first port 335 and the second port 360 face opposite directions causes the audio device 300 to emit acoustic pressure waves from the first speaker 305 and from the second speaker 310 in opposite directions. This results in the audio device 300 forming a dipole where the acoustic pressure waves from the first speaker 305 are 180 degrees out of phase with the acoustic pressure waves from the second speaker 310. For example, when the audio device 300 is included in a frame 110 of a headset 100, the first port 335 is directed towards a user, while the second port 360 is directed to a local area surrounding the headset 100. Such a dipole configuration of output of the first speaker 305 and the second speaker 310 from positioning of the first port 335 relative to the second port 360 allows the audio device 300 to cancel force generated from movement of the first membrane 315 with force generated from opposing movement of the second membrane 340, mitigating vibration from the audio device 300 affecting a device, such as a headset 100 or other wearable device, including the audio device 300.

The configuration described in conjunction with FIGS. 3 and 4 allow the first speaker 305 and the second speaker 310 to have a dipole configuration and allow the shared back volume 365 to be sealed. Having the shared back volume 365 sealed reduces or eliminates a risk of water intrusion into portions of the audio device 300 that include the voice coil 320 and the voice coil 345. The shared back volume 365 sealed may also reduce the number of ports on the outside of the audio device 300. Reducing the number of ports can reduce the risk of water intrusion and can reduce the number of port meshes which may simplify the assembly process. Further, having the shared back volume 365 sealed may eliminate or reduce a desire to provide a restrictive mesh over the first port 335 or the second port 360 (e.g., configured to reduce water or debris entering portions of the audio device 300 that include the voice coil 320 and the voice coil 345). Inclusion of a restrictive mesh may result in reduced audio output at low frequencies relative to the dipole configuration with the shared back volume 365 shown in FIGS. 3 and 4.

In a dipole configuration, the audio device 300 may allow for a deliberate mismatch between movement of the first membrane 315 of the first speaker 305 and the second membrane 340 of the second speaker 310 in some embodiments. An amount of mismatch between movement of the first membrane 315 and the second membrane 340 determines a polar patten of audio output by the audio device through cardioid shading. For example, mismatch between movement of the first membrane 315 and the second membrane 340 reduces audio pressure waves output by the second port 360 relative to the first port 335. Reducing audio output at the second port 360 by reducing movement of the second membrane 340 relative to the first membrane 315 allows the audio device 300 to produce a cardioid or monopole-like polar pattern resulting in reduced low frequency cancellation compared to a traditional dipole configuration. In some embodiments, the mismatch between movement of the first membrane 315 and the second membrane 340 is achieved by reducing the power delivered to the first speaker 305 or to the second speaker 310. For example, reducing power delivered to the second speaker 310 may provide increased low frequency output of the audio device 300 while reducing an amount of force cancellation from movement of the first membrane 315 provided by movement of the second membrane 340. Such an embodiment allows the audio device 300 to provide greater low frequency output by reducing an input voltage received by the second speaker 310 (or to the first speaker 305). In some embodiments, a filter is applied to output of the audio device 300 having the isobaric shared back volume 365 and the outputs of the first speaker 305 and the second speaker 310 having a dipole configuration allows the output of the audio device to transition from a monopole-like or cardioid polar pattern at low frequencies, which provides for improved bass performance, to a dipole (or a linear quadrupole) pattern at high frequencies to reduce audio output from the audio device 300 to areas other than the first port 335, providing increased privacy to a user by reducing audio output by the second port 360.

In the embodiment shown by FIG. 3, the first speaker 305 and the second speaker 310 are aligned with each other. When the first speaker 305 is aligned with the second speaker 310, a plane perpendicular to the first speaker 305 (e.g., perpendicular to a surface of first membrane 315) or the second speaker 310 (e.g., perpendicular to a surface of the second membrane 340) includes a first reference point of the first speaker 305 and includes a second reference point of the second speaker 310. The reference points may correspond to the same or similar components or points of each speaker. For example, the first reference point is an edge of the first membrane 315 and the second reference point is an edge of the second membrane 340. In the embodiment shown in FIG. 3, a plane perpendicular to the first membrane 315 also includes the edge of the second membrane 340. Aligning the first speaker 305 and the second speaker 310 increases (e.g., maximizes) cancellation of force generated by the first speaker 305 when generating audio pressure waves by movement of the second speaker 310 and vice versa. In some embodiments, a plane perpendicular to a speaker (e.g., 305) may be parallel to the direction of audio pressure waves generated by the membrane (e.g., 315) of that speaker. Similarly, a plane parallel to a speaker may be perpendicular to the direction of audio pressure waves generated by that speaker.

Figure 5:
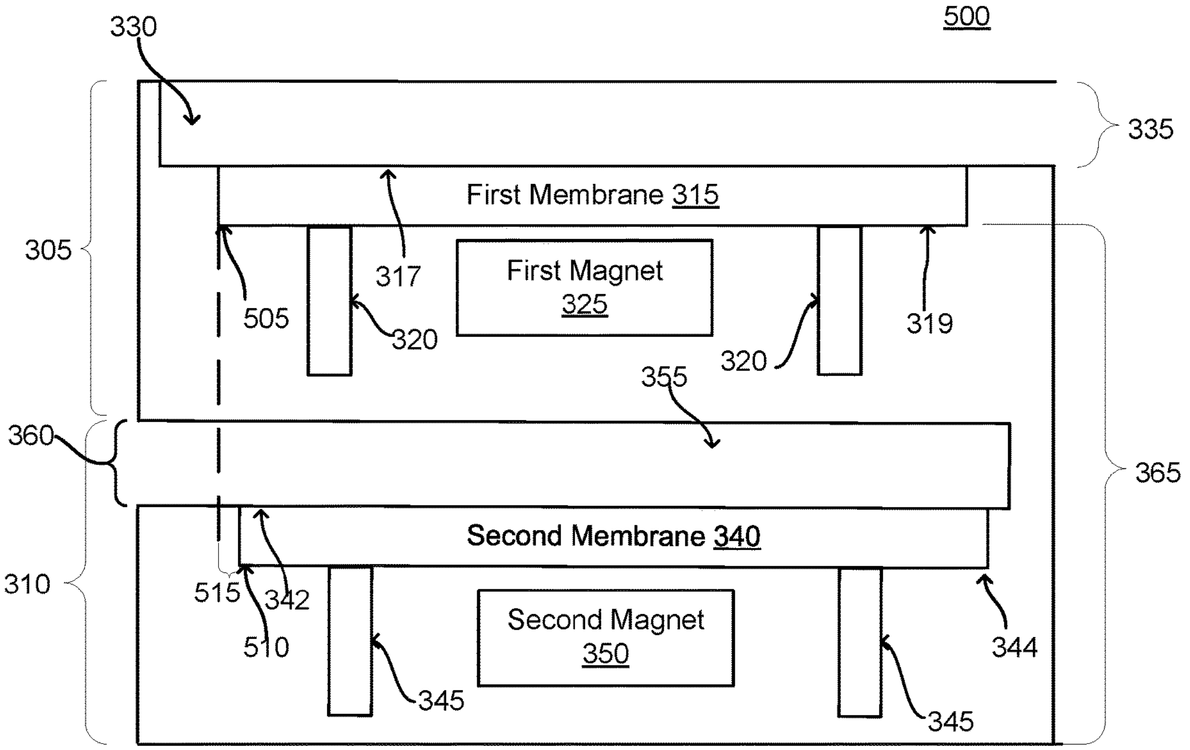
FIG. 5 is an embodiment of an audio device including a first speaker and a second speaker 310 that are offset from each other, in accordance with one or more embodiments.

However, in some embodiments, the first speaker 305 and the second speaker 305 are offset from each other. FIG. 5 shows an embodiment of an audio device 500 including a first speaker 305 that is offset from a second speaker 310. For purposes of illustration, FIG. 5 shows an embodiment of the audio device 500 where the first speaker 305 and the second speaker 310 are stacked (i.e., positioned so both the first speaker 305 and the second speaker 310 are perpendicular to a reference plane intersecting the first speaker 305 and the second speaker 310) relative to each other, while in other embodiments the first speaker 305 and the second speaker 310 have different positions relative to each other.

The first speaker 305 includes a first membrane 315 having a first front surface 317 and a first back surface 319, with one or more voice coils 320 coupled to the first back surface 319, as further described above in conjunction with FIG. 3. Additionally, the first speaker 305 includes a first magnet 325 proximate to the first membrane 315, and a first front volume 330 that is formed in part by the first front surface 317 of the first membrane 315. As further described above in conjunction with FIG. 3, movement of the first membrane 315 generates acoustic pressure waves in the first front volume 330, which includes a first port 335 where the acoustic pressure waves exit the first front volume 330.

Similarly, the second speaker 310 includes a second membrane 340 having a second front surface 342 and a second back surface 344, with one or more voice coils 345 coupled to the second back surface 344, as further described above in conjunction with FIG. 3. The second speaker 310 includes a second magnet 350 proximate to the second membrane 340, and a second front volume 355 that is formed in part by the second front surface 342 of the second membrane 340. As further described above in conjunction with FIG. 3, movement of the second membrane 340 generates acoustic pressure waves in the second front volume 355, which includes a second port 360 where the acoustic pressure waves exit the second front volume 355.

FIG. 5 identifies a first reference point 505 of the first membrane 315. For purposes of illustration, FIG. 5 shows the first reference point 505 as an edge of the first membrane 315. However, the first reference point 505 may be another location on the first membrane 315. FIG. 5 also identifies a second reference point 510 of the second membrane 340. In the example shown by FIG. 5, the second reference point 510 is an edge of the second membrane 315. The second reference point 510 is offset by an amount 515 from a plane perpendicular to the first speaker 305 (the plane is indicated in FIG. 5 by a vertical dashed line). Offsetting the first reference point 505 and the second reference point 510 by the amount 515 allows the first speaker 305 and the second speaker 310 to be shifted relative to each other, allowing inclusion of the audio device 500 in a wider range of areas, allowing greater flexibility for dimensions of housings, such as a frame 110, including the audio device 500. For example, the amount 515 of offset between the first speaker 305 and the second speaker 310 allows the audio device 500 to better fit in housings that are angled, with the offset between the first speaker 305 and the second speaker 310 allowing the first speaker 305 and the second speaker 310 to be positioned relative to each other to better account for an angle of a housing. While an offset between the first speaker 305 and the second speaker 310 may reduce an amount of force cancellation provided by opposing movement of the first membrane 315 and the second membrane 340, the reduction in force cancellation increases space efficiency of the audio device 500, allowing its use in a wider range of housing designs. In contrast, FIG. 3 shows an embodiment where the first reference point 505 is aligned with the second reference point 510 so a plane perpendicular to the first speaker 305 or the second speaker 310 includes the second reference point 510 and the first reference point 505, which increases force cancellation between the first speaker 305 and the second speaker 310.

Figure 6:
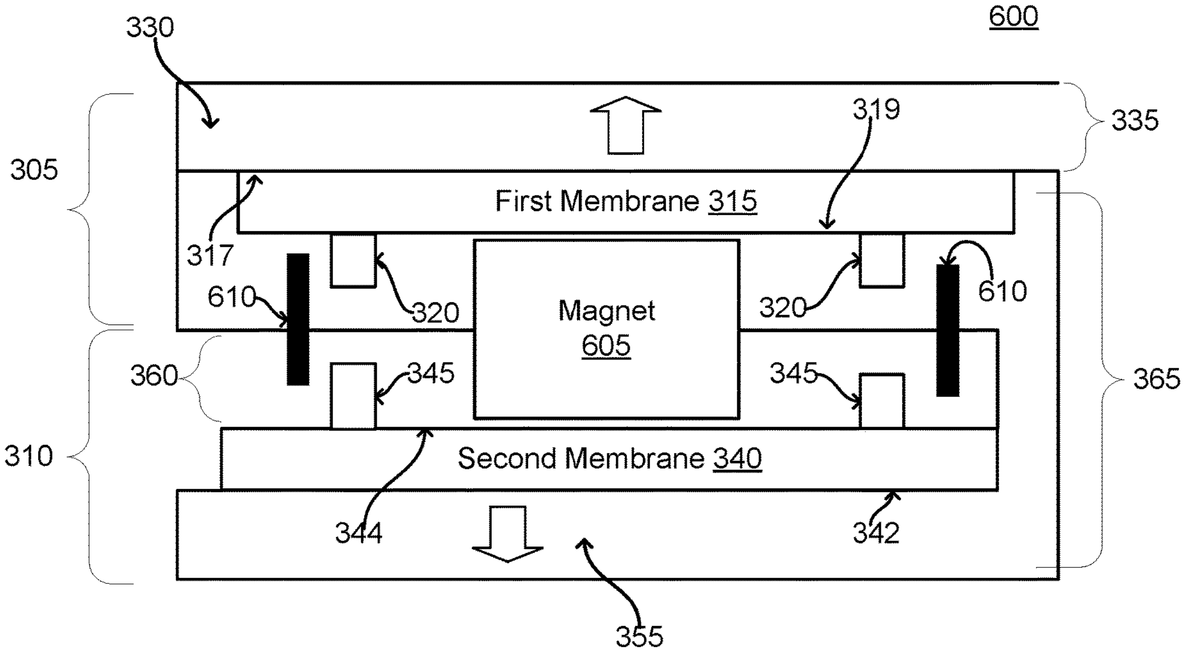
FIG. 6 is a cross-section of an audio device having a single magnet shared by a first speaker and a second speaker, in accordance with one or more embodiments.

While FIGS. 3-5 show embodiments of an audio device including a first magnet 325 and a second magnet 350 positioned proximate to a first membrane 315 and to a second membrane 340, respectively, in other embodiments, a single magnet is used with voice coil 320 and voice coil 345 to move the first membrane 315 and the second membrane 340. FIG. 6 shows an embodiment of an audio device 600 having a single magnet shared by a first speaker 305 and a second speaker 310.

The audio device 600 includes a first speaker 305 and a second speaker 310. The first speaker 305 includes a first membrane 315 having a first front surface 317 and a first rear surface 319. One or more voice coils 320 are coupled to the first rear surface 319 of the first membrane 315, as further described above in conjunction with FIG. 3. A first side of a magnet 605 is proximate to the first rear surface 319 of the first membrane 315. As further described above in conjunction with FIG. 3, reactions between the magnetic field of the magnet 605 and a magnetic field generated by the voice coil 320 cause the first membrane 315 to move towards or away from the first side of the magnet 605. This movement of the first membrane 315 generates acoustic pressure waves in a first front volume 330 that is at least partially formed by the first front surface 317 of the first membrane 315. The acoustic pressure waves are guided by the first front volume 330 to a first port 335, where the acoustic pressure waves are output.

Similarly, the second speaker 310 includes a second membrane 340 having a first front surface 342 and a second rear surface 344. One or more voice coils 345 are coupled to the second rear surface 344 of the second membrane 340, as further described above in conjunction with FIG. 3. A second side of the magnet 605 is proximate to the second rear surface 344 of the second membrane 340. As further described above in conjunction with FIG. 3, reactions between the magnetic field of the magnet 605 and a magnetic field generated by the voice coil 345 cause the second membrane 340 to move towards or away from the second side of the magnet 605. The second side of the magnet 605 is opposite the first side of the magnet 605 in various embodiments, allowing a single magnet 605 to provide the magnetic field with which the one or more voice coils 330 of the first speaker 305 and the one or more voice coils 345 interact to move the first membrane 315 and the second membrane 340, respectively.

The audio device 600 also includes one or more magnetic cores 610 positioned a distance from the magnet 605, with a magnetic core 610 forming a magnetic circuit that is a closed loop path including the magnetic flux from the magnet 605. The magnetic core 610 is a ferromagnetic material in various embodiments that confines the magnetic flux generated by the magnet 605 to a path that is bounded by the one or more magnetic cores 610. Example ferromagnetic materials comprising a magnetic core 610 include iron, steel, nickel, although other ferromagnetic materials may be used in various embodiments. As shown in FIG. 6, the magnetic cores 610 are positioned farther from the magnet 605 than the one or more voice coils 320 and the one or more voice coils 345. While FIG. 6 shows the one or more magnetic cores 610 that are perpendicular to the first membrane 315 and to the second membrane 340, the audio device 600 also includes one or more additional magnetic cores (not shown) that are parallel to the first membrane 315 and to the second membrane 340. The additional magnetic cores are between the first side of the magnet 605 and the first back surface 319 of the first membrane 315 and between the second side of the magnet 605 and the second back surface 344 of the second membrane 340. In some embodiments, the magnetic cores 610 are coupled to the additional magnetic cores to enclose the magnet 605 and the magnetic flux generated by the magnet 605.

With the magnet 605 providing a magnetic field for both the first membrane 315 and the second membrane 340, the second speaker 310 includes the second port 360 proximate to the second rear surface 344 of the second membrane 340. In various embodiments, the second port 360 is an opening in the shared back volume 365 of the first speaker 305 and the second speaker 310. As the second membrane 340 moves in an opposite direction than the first membrane 315 to cancel force generated by movement of the first membrane 315, inclusion of the second port 360 near the second rear surface 344 in the shared back volume 365 allows movement of the second membrane 340 to offset pressure changes in the shared back volume 365 caused by movement of the first membrane 315. For example, as the first membrane 315 moves away from the magnet 605, the first back surface 319 of the first membrane 315 moves away from a surface between the second back surface 344 of the second membrane 340 and the magnet 605, decreasing pressure in the shared back volume 365. To offset the pressure decrease in the shared back volume 365 from movement of the first membrane 315, the second membrane 340 moves away from the magnet 605. Movement of the second membrane 340 away from the magnet 605 causes the second back surface 344 of the second membrane 340 to move into the shared back volume 365 and compress air against a housing comprising a portion of a second front volume 355 of the second speaker 310, increasing a pressure in the shared back volume 365 that offsets the decrease in pressure in the shared back volume 365 from movement of the first membrane 315 away from the magnet 605. While having the second port 360 comprise an opening in the shared back volume 365 allows the audio device 600 to maintain isobaric pressure while using a single magnet 605 for both the first speaker 305 and the second speaker 310, such positioning of the second port 360 increases a potential risk of water or other fluid contacting the voice coils 320 or the voice coils 345. Such placement of the second port 360 in the shared back volume 365 may limit design configurations in which the audio device 600 may be used. In FIG. 6, the shared back volume 365 includes the volume beneath the back surface 319 and beneath the front surface 342. The volume 360 is isolated from this shared back volume.

Figure 7:
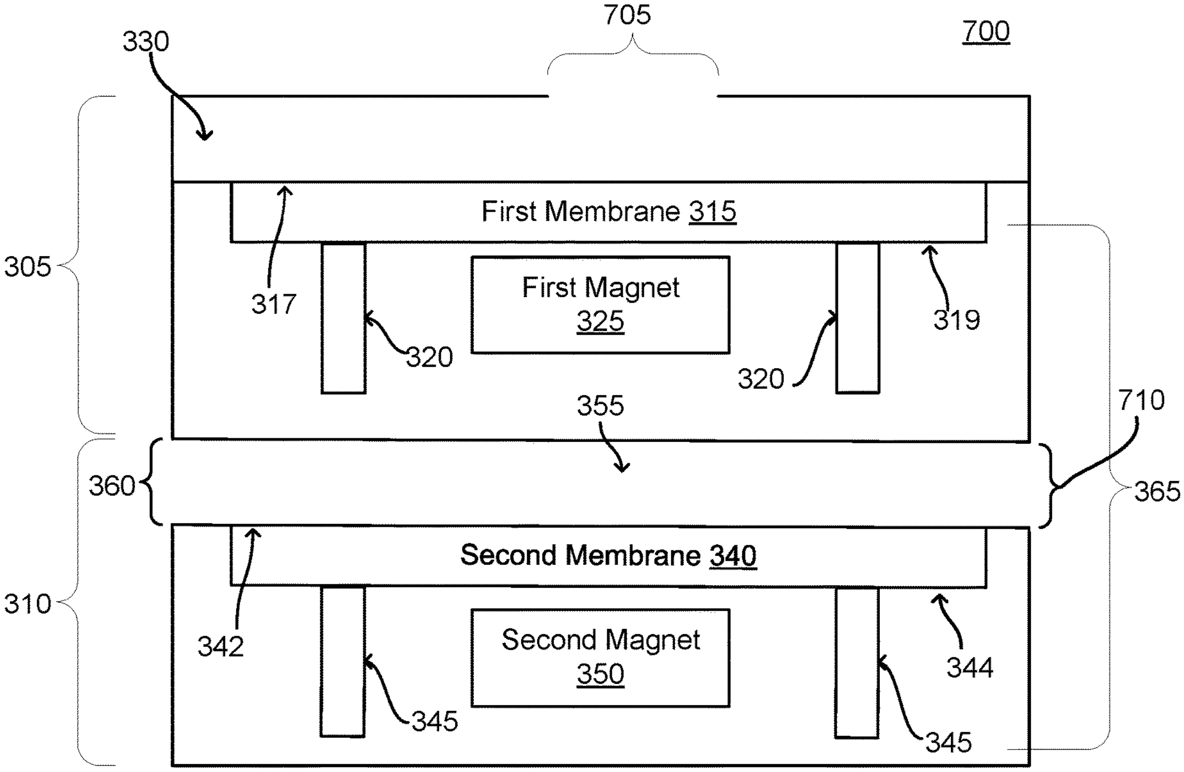
FIG. 7 is a cross-sectional view of an alternative audio device acting as a linear quadrupole source that includes a plurality of speakers, in accordance with one or more embodiments.

While FIGS. 3-6 depict configurations of audio devices providing a dipole source for output of audio content, in other embodiments, an audio device is configured to act as different types of sources for audio output. FIG. 7 shows a cross-sectional view of an alternative embodiment of an audio device 700 acting as a linear quadrupole source that includes a plurality of speakers. In the embodiment shown by FIG. 7, the audio device 700 includes a first speaker 305 and a second speaker 310.

The first speaker 305 includes a first membrane 315 having a first front surface 317 and a first rear surface 319. One or more voice coils 320 are coupled to the first rear surface 319 of the first membrane 315, as further described above in conjunction with FIG. 3. A first magnet 325 is proximate to the first rear surface 319 of the first membrane 315. As further described above in conjunction with FIG. 3, reactions between the magnetic field of the first magnet 325 and a magnetic field generated by the voice coil 320 cause the first membrane 315 to move towards or away from the first magnet 325. This movement of the first membrane 315 generates acoustic pressure waves in a first front volume 330 that is at least partially formed by the first front surface 317 of the first membrane 315. The acoustic pressure waves are guided by the first front volume 330 to a first port 705, where the acoustic pressure waves are output. In various embodiments, the first port 705 is in a plane that is perpendicular to a plane including the first membrane 315, with the first port 705 facing a common direction as the first front surface 317 of the first membrane 315. In various embodiments, the first front surface 317 is sealed other than the first port 705.

Similarly, the second speaker 310 includes a second membrane 340 having a first front surface 342 and a second rear surface 344. One or more voice coils 345 are coupled to the second rear surface 344 of the second membrane 340, as further described above in conjunction with FIG. 3. A second magnet 350 is proximate to the second rear surface 344 of the second membrane 340. As further described above in conjunction with FIG. 3, reactions between the magnetic field of the second magnet 350 and a magnetic field generated by the voice coil 345 cause the second membrane 340 to move towards or away from the second magnet 350.

The second speaker 310 also includes a second front volume 355 that is at least partially formed by the second front surface 342 of the second membrane 340. In the embodiment shown by FIG. 7, the second front volume 355 includes a second port 360 and an additional port 710. The second port 360 and the additional port 710 are at opposite ends of the second front volume 355. For example, the second port 360 is at a first end of the second front volume 355, and the additional port 710 is at a second end of the second front volume 355, where the first end and the second end are in planes that are parallel to each other. In various embodiments, the second port 360 and the additional port 710 are positioned along an axis that is perpendicular to the second port 360 and to the additional port 710. The second port 360 and the additional port 710 face in opposite directions. The second front volume 355 directs acoustic pressure waves generated from movement of the second membrane 340 to the second port 360 and to the additional port 710 where the acoustic pressure waves are output from the audio device 700. In various embodiments, the second port 360 and the additional port 710 face in directions that are shifted ninety degrees relative to a direction in which the first port 705 faces. For example, the audio device 700 is included in an end piece of a frame 110 of a headset 100, with the first port 705 facing away from a user of the headset 100 and into a local area surrounding the headset. In the preceding example, the second port 360 faces ninety degrees from the first port 705 in a first direction, while the additional port 710 faces ninety degrees from the first port 705 in a second direction that is 180 degrees from the first direction (e.g., the second port 360 is directed upward and the additional port 710 is directed downward, or vice versa). The positioning of the first port 705, the second port 360, and the additional port 710 relative to each other in FIG. 7 causes the audio device 700 to have a linear quadrupole configuration having parallel and in-line force vectors from output of audio pressure waves, preventing movement of the audio device 700 (or of a device including the audio device) from output of audio pressure waves by the audio device 700.

Figure 8:
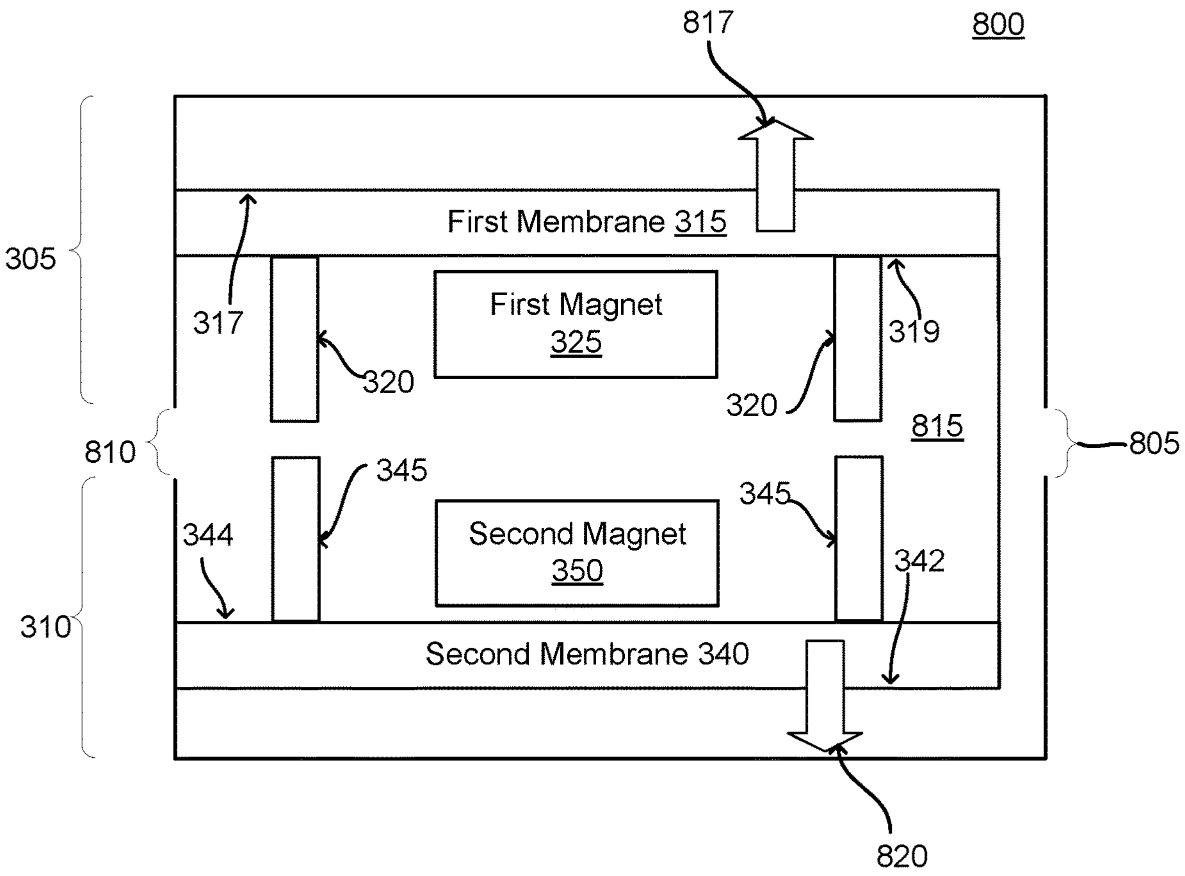
FIG. 8 is a cross-section of an alternative audio device configured to mitigate vibrations from playing audio content, in accordance with one or more embodiments.

FIG. 8 shows a cross-section of an alternative embodiment of an audio device 800 configured to mitigate vibrations from playing audio content. The audio device 800 includes a first speaker 305 and a second speaker 310. In various embodiments, the audio device 800 is included in a housing, such as a portion of a frame 110 of a headset 100, although the audio device 800 may be included in other devices in other embodiments.

The first speaker 305 includes a first membrane 315 having a first front surface 317 and a first rear surface 319. One or more voice coils 320 are coupled to the first rear surface 319 of the first membrane 315, as further described above in conjunction with FIG. 3. A first magnet 325 is proximate to the first rear surface 319 of the first membrane 315. As further described above in conjunction with FIG. 3, reactions between the magnetic field of the first magnet 325 and a magnetic field generated by the voice coil 320 cause the first membrane 315 to move towards or away from the first magnet 325. This movement of the first membrane 315 generates acoustic pressure waves. Pressure waves generated by the first front surface 317 are output by a first port 805, and pressure waves generated by the first rear surface 319 are output by a second port 810. The ports 805 and 810 allow acoustic pressure waves formed from movement of the first membrane 315 to be output from an enclosure including the audio device 800.

Similarly, the second speaker 310 includes a second membrane 340 having a second front surface 342 and a second rear surface 344. One or more voice coils 345 are coupled to the second rear surface 344 of the second membrane 340, as further described above in conjunction with FIG. 3. The second front surface 342 faces away from the first rear surface 319 of the first membrane 315, so the first front surface 317 faces an opposite direction than the second front surface 342. A second magnet 350 is proximate to the second rear surface 344 of the second membrane 340. As further described above in conjunction with FIG. 3, reactions between the magnetic field of the second magnet 350 and a magnetic field generated by the voice coil 345 cause the second membrane 340 to move towards or away from the second magnet 350. Movement of the second membrane 340 generates acoustic pressure waves. Pressure waves generated by the second front surface 342 are output by the first port 805, and pressure waves generated by the second rear surface 344 are output by the second port 810. The ports 805 and 810 allow acoustic pressure waves formed from movement of the second membrane 340 to be output from an enclosure including the audio device 800. The second port 810 is included in a back volume 815 shared between the first speaker 305 and the second speaker 310, so the second port 810 is proximate to the second rear surface 344 of the second membrane 340, as shown in FIG. 8. In various embodiments, the back volume 815 is between the first rear surface 319 of the first membrane 315 and the second rear surface 344 of the second membrane 340. As illustrated in FIG. 8, the front surfaces 317 and 342 are isolated from the rear surfaces 319 and 344 (e.g., there is a waveguide that isolates the front surfaces from the rear surfaces). Thus, in these embodiments, there may be no internal connection between the ports 810 and 805. Said differently, a volume formed by the front surfaces 317 and 342 is separate (e.g., isolated) from a volume (e.g., volume 815) formed by the rear surfaces 319 and 344. In various embodiments, the first port 805 and the second port 810 are along a common axis, with the common axis perpendicular to the first port 805 and the second port 810 and the common axis intersecting a center of the first port 805 and a center of the second port 810. Although the ports 805, 810 are along an axis that is evenly spaced between the speakers 305, 310, this is not required. For example, the ports 805, 810 could be shifted up or down relative to the speakers 305, 310 (but still be along a common axis). For example, the ports 805, 810 are shifted downward in FIG. 9.

The first membrane 315 and the second membrane 340 move in opposite directions when the audio device 800 outputs audio content. Hence, the first membrane 315 and the second membrane 340 move an equal amount in opposing directions when the audio device 800 outputs audio content. For example, in FIG. 8, when the first membrane 315 moves 817 away from the first magnet 325, the second membrane 340 moves 820 away from the second magnet 350. As the first membrane 315 and the second membrane 340 face in opposite directions (e.g., directions oriented 180 degrees relative to each other), the movement 817 is opposite to movement 820. Additionally, the first port 805 and the second port 810 face opposite directions, so a common axis intersecting the center of the first port 805 and the center of the second port 810 forms a null plane where force from the first membrane 315 producing acoustic pressure waves cancels force from the second membrane 340 producing acoustic pressure waves. In various embodiments, the null plane formed by the first port 805 and the second port 810 is directed to a specific location to cancel force from the audio device 800 outputting audio data. For example, when the audio device 800 is included in a frame 110 of a headset 100, the audio device 800 is positioned so the null plane formed the first port 805 and the second port 810 includes a position sensor 190. Such positioning of the position sensor 190 along the null plane formed by the first port 805 and the second port 810 mitigates effects of vibration from the audio device 800 outputting audio data on the position sensor 190. This allows the position sensor 190 to more accurately determine a position of the headset 100 by preventing vibrations from presentation of audio data introducing additional noise into signals received by the position sensor 190.

Figure 9:
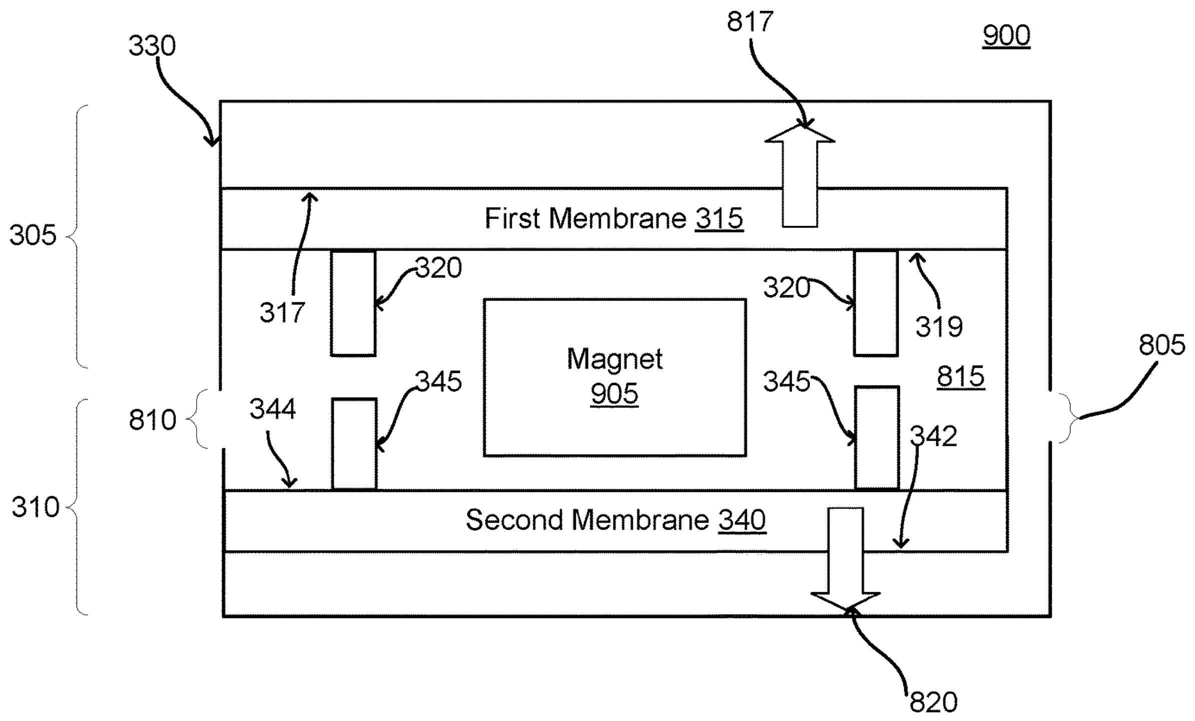
FIG. 9 is a cross-section of an audio device including a single magnet and having ports arranged to form a null plane, in accordance with one or more embodiments.

While FIG. 8 shows an embodiment where the audio device 800 includes a first magnet 325 and a second magnet 350, in other embodiments, the audio device includes a single magnet 905. FIG. 9 shows an embodiment of an audio device 900 including a single magnet 905 and having ports arranged to form a null plane. As shown in FIG. 9, a first side of the magnet 905 is near the first rear membrane 319 and a second side of the magnet 905 is near the second rear membrane 344, as shown in FIG. 9. In some embodiments, the audio device 900 includes magnetic cores surrounding the magnet 905 to form a magnetic circuit enclosing magnetic flux from the magnet 905, as further described above in conjunction with FIG. 6. The first port 805 and the second port 810 are along a common axis, with the common axis perpendicular to the first port 805 and the second port 810. As further described above in conjunction with FIG. 8, in some embodiments the common axis intersects a center of the first port 805 and a center of the second port 810. Similar to FIG. 8 and related description, pressure waves generated by the front surfaces 317 and 342 are output by the first port 805, and pressure waves generated by the rear surfaces 319 and 344 are output by the second port 810. Furthermore, the volume formed by the front surfaces 317 and 342 is separate (e.g., isolated) from the volume (e.g., volume 815) formed by the rear surfaces 319 and 344. The first port 805 and the second port 810 are near the first rear surface 319 and the second rear surface 344, as shown in FIG. 8. As further described above in conjunction with FIG. 8, the first membrane 315 and the second membrane 340 move in opposite directions when the audio device 900 outputs audio content. Using a single magnet allows the size of the audio device 900 to be decreased relative to a size of audio device 800. Alternatively, using a single magnet allows audio device 900 to have a common size as audio device 800, while increasing a volume of air within the audio device 900, allowing for greater displacement of air by movement of the first membrane 315 and the second membrane 340 in audio device 900.

Figure 10:
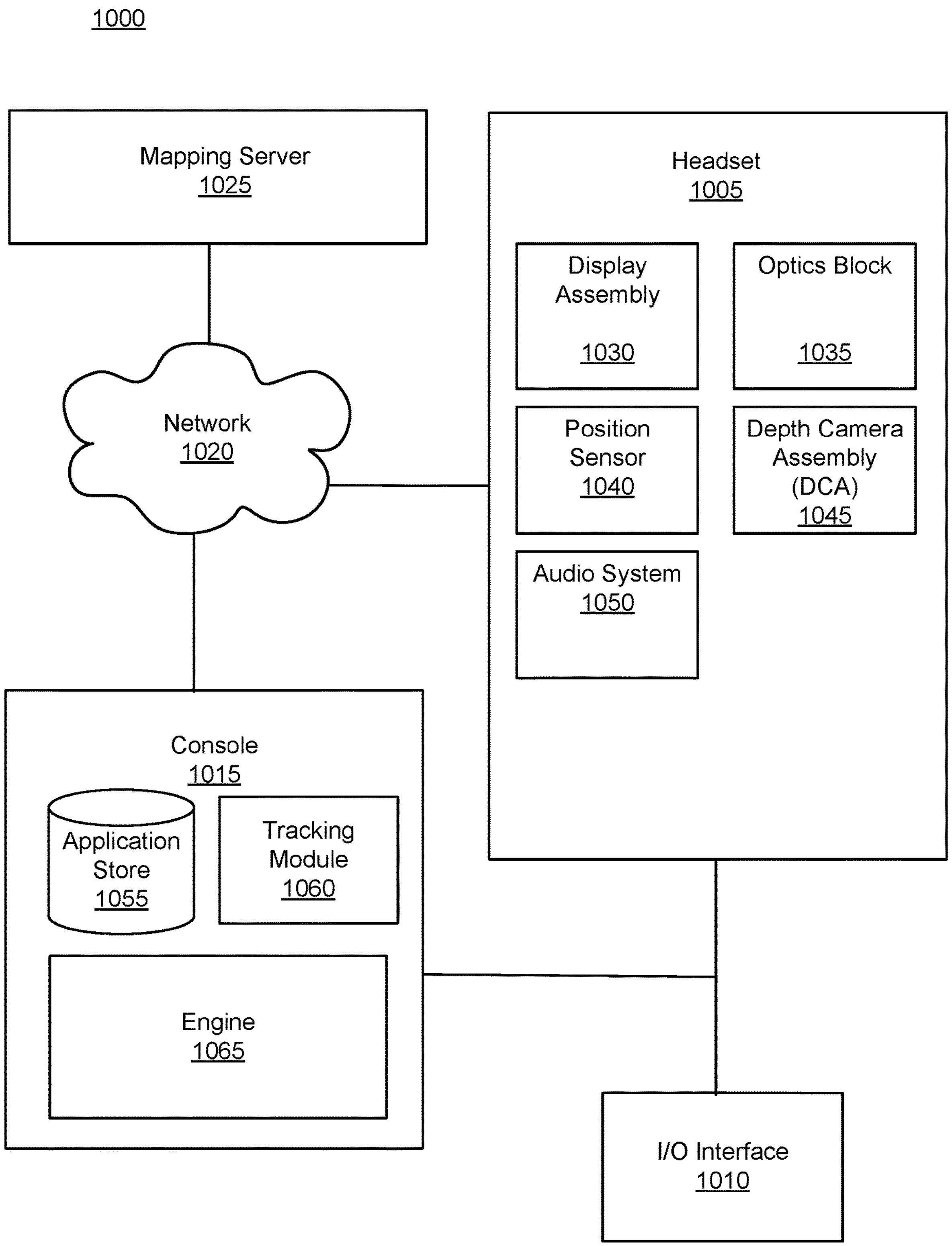
FIG. 10 is a system that includes a headset, in accordance with one or more embodiments.

FIG. 10 is a system 1000 that includes a headset 1005, in accordance with one or more embodiments. In some embodiments, the headset 1005 may be the headset 100 of FIG. 1A or the headset 105 of FIG. 1B. The system 1000 may operate in an artificial reality environment (e.g., a virtual reality environment, an augmented reality environment, a mixed reality environment, or some combination thereof). The system 1000 shown by FIG. 10 includes the headset 1005, an input/output (I/O) interface 1010 that is coupled to a console 1015, the network 1020, and the mapping server 1025. While FIG. 10 shows an example system 1000 including one headset 1005 and one I/O interface 1010, in other embodiments any number of these components may be included in the system 1000. For example, there may be multiple headsets each having an associated I/O interface 1010, with each headset and I/O interface 1010 communicating with the console 1015. In alternative configurations, different and/or additional components may be included in the system 1000. Additionally, functionality described in conjunction with one or more of the components shown in FIG. 10 may be distributed among the components in a different manner than described in conjunction with FIG. 10 in some embodiments. For example, some or all of the functionality of the console 1015 may be provided by the headset 1005.

The headset 1005 includes the display assembly 1030, an optics block 1035, one or more position sensors 1040, and the DCA 1045. Some embodiments of headset 1005 have different components than those described in conjunction with FIG. 10. Additionally, the functionality provided by various components described in conjunction with FIG. 10 may be differently distributed among the components of the headset 1005 in other embodiments, or be captured in separate assemblies remote from the headset 1005.

The display assembly 1030 displays content to the user in accordance with data received from the console 1015. The display assembly 1030 displays the content using one or more display elements (e.g., the display elements 120). A display element may be, e.g., an electronic display. In various embodiments, the display assembly 1030 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 1035.

The optics block 1035 may magnify image light received from the electronic display, corrects optical errors associated with the image light, and presents the corrected image light to one or both eyeboxes of the headset 1005. In various embodiments, the optics block 1035 includes one or more optical elements. Example optical elements included in the optics block 1035 include: an aperture, a Fresnel lens, a convex lens, a concave lens, a filter, a reflecting surface, or any other suitable optical element that affects image light. Moreover, the optics block 1035 may include combinations of different optical elements. In some embodiments, one or more of the optical elements in the optics block 1035 may have one or more coatings, such as partially reflective or anti-reflective coatings.

Magnification and focusing of the image light by the optics block 1035 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 1035 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1035 corrects the distortion when it receives image light from the electronic display generated based on the content.

The position sensor 1040 is an electronic device that generates data indicating a position of the headset 1005. The position sensor 1040 generates one or more measurement signals in response to motion of the headset 1005. The position sensor 190 is an embodiment of the position sensor 1040. Examples of a position sensor 1040 include: one or more IMUs, one or more accelerometers, one or more gyroscopes, one or more magnetometers, another suitable type of sensor that detects motion, or some combination thereof. The position sensor 1040 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 1005 from the sampled data. For example, the IMU integrates the measurement signals received from the accelerometers over time to estimate a velocity vector and integrates the velocity vector over time to determine an estimated position of a reference point on the headset 1005.

The reference point is a point that may be used to describe the position of the headset 1005. While the reference point may generally be defined as a point in space, however, in practice the reference point is defined as a point within the headset 1005.

The DCA 1045 generates depth information for a portion of the local area. The DCA includes one or more imaging devices and a DCA controller. The DCA 1045 may also include an illuminator. Operation and structure of the DCA 1045 is described above with regard to FIG. 1A.

The audio system 1050 provides audio content to a user of the headset 1005. The audio system 1050 is substantially the same as the audio system 200 describe above. The audio system 1050 may comprise one or acoustic sensors, one or more transducers, and an audio controller. In various embodiments described herein, such as in conjunction with FIGS. 3-9, a transducer may be an audio device that includes multiple speakers. The audio system 1050 may provide spatialized audio content to the user. In some embodiments, the audio system 1050 may request acoustic parameters from the mapping server 1025 over the network 1020. The acoustic parameters describe one or more acoustic properties (e.g., room impulse response, a reverberation time, a reverberation level, etc.) of the local area. The audio system 1050 may provide information describing at least a portion of the local area from e.g., the DCA 1045 and/or location information for the headset 1005 from the position sensor 1040. The audio system 1050 may generate one or more sound filters using one or more of the acoustic parameters received from the mapping server 1025, and use the sound filters to provide audio content to the user.

The I/O interface 1010 is a device that allows a user to send action requests and receive responses from the console 1015. An action request is a request to perform a particular action. For example, an action request may be an instruction to start or end capture of image or video data, or an instruction to perform a particular action within an application. The I/O interface 1010 may include one or more input devices. Example input devices include: a keyboard, a mouse, a game controller, or any other suitable device for receiving action requests and communicating the action requests to the console 1015. An action request received by the I/O interface 1010 is communicated to the console 1015, which performs an action corresponding to the action request. In some embodiments, the I/O interface 1010 includes an IMU that captures calibration data indicating an estimated position of the I/O interface 1010 relative to an initial position of the I/O interface 1010. In some embodiments, the I/O interface 1010 may provide haptic feedback to the user in accordance with instructions received from the console 1015. For example, haptic feedback is provided when an action request is received, or the console 1015 communicates instructions to the I/O interface 1010 causing the I/O interface 1010 to generate haptic feedback when the console 1015 performs an action.

The console 1015 provides content to the headset 1005 for processing in accordance with information received from one or more of: the DCA 1045, the headset 1005, and the I/O interface 1010. In the example shown in FIG. 10, the console 1015 includes an application store 1055, a tracking module 1060, and an engine 1065. Some embodiments of the console 1015 have different modules or components than those described in conjunction with FIG. 10. Similarly, the functions further described below may be distributed among components of the console 1015 in a different manner than described in conjunction with FIG. 10. In some embodiments, the functionality discussed herein with respect to the console 1015 may be implemented in the headset 1005, or a remote system.

The application store 1055 stores one or more applications for execution by the console 1015. An application is a group of instructions, that when executed by a processor, generates content for presentation to the user. Content generated by an application may be in response to inputs received from the user via movement of the headset 1005 or the I/O interface 1010. Examples of applications include: gaming applications, conferencing applications, video playback applications, or other suitable applications.

The tracking module 1060 tracks movements of the headset 1005 or of the I/O interface 1010 using information from the DCA 1045, the one or more position sensors 1040, or some combination thereof. For example, the tracking module 1060 determines a position of a reference point of the headset 1005 in a mapping of a local area based on information from the headset 1005. The tracking module 1060 may also determine positions of an object or virtual object. Additionally, in some embodiments, the tracking module 1060 may use portions of data indicating a position of the headset 1005 from the position sensor 1040 as well as representations of the local area from the DCA 1045 to predict a future location of the headset 1005. The tracking module 1060 provides the estimated or predicted future position of the headset 1005 or the I/O interface 1010 to the engine 1065.

The engine 1065 executes applications and receives position information, acceleration information, velocity information, predicted future positions, or some combination thereof, of the headset 1005 from the tracking module 1060. Based on the received information, the engine 1065 determines content to provide to the headset 1005 for presentation to the user. For example, if the received information indicates that the user has looked to the left, the engine 1065 generates content for the headset 1005 that mirrors the user's movement in a virtual local area or in a local area augmenting the local area with additional content. Additionally, the engine 1065 performs an action within an application executing on the console 1015 in response to an action request received from the I/O interface 1010 and provides feedback to the user that the action was performed. The provided feedback may be visual or audible feedback via the headset 1005 or haptic feedback via the I/O interface 1010.

The network 1020 couples the headset 1005 and/or the console 1015 to the mapping server 1025. The network 1020 may include any combination of local area and/or wide area networks using both wireless and/or wired communication systems. For example, the network 1020 may include the Internet, as well as mobile telephone networks. In one embodiment, the network 1020 uses standard communications technologies and/or protocols. Hence, the network 1020 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1020 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1020 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 1025 may include a database that stores a virtual model describing a plurality of spaces, wherein one location in the virtual model corresponds to a current configuration of a local area of the headset 1005. The mapping server 1025 receives, from the headset 1005 via the network 1020, information describing at least a portion of the local area and/or location information for the local area. The user may adjust privacy settings to allow or prevent the headset 1005 from transmitting information to the mapping server 1025. The mapping server 1025 determines, based on the received information and/or location information, a location in the virtual model that is associated with the local area of the headset 1005. The mapping server 1025 determines (e.g., retrieves) one or more acoustic parameters associated with the local area, based in part on the determined location in the virtual model and any acoustic parameters associated with the determined location. The mapping server 1025 may transmit the location of the local area and any values of acoustic parameters associated with the local area to the headset 1005.

One or more components of system 1000 may contain a privacy module that stores one or more privacy settings for user data elements. The user data elements describe the user or the headset 1005. For example, the user data elements may describe a physical characteristic of the user, an action performed by the user, a location of the user of the headset 1005, a location of the headset 1005, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 1000 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An audio device comprising:
- a first membrane including a first front surface and a first back surface;
- a second membrane including a second front surface and a second back surface, and the second front surface faces toward the first back surface;
- a first front volume that includes a first port and is formed in part by the first front surface, and is configured to output first acoustic pressure waves generated by the first membrane via the first port;
- a second front volume that includes a second port and is formed in part by the second front surface, and is configured to output acoustic pressure waves generated by the second membrane via the second port; and
- a shared back volume that is formed in part by the first back surface and the second back surface and pressure within the shared back volume is configured to be isobaric.

2. The audio device of claim 1, wherein the first port faces an opposite direction than the second port.

3. The audio device of claim 1, wherein the first membrane is configured to move in a first direction and the second membrane is configured to move in a second direction when the audio device outputs audio content, the first direction opposite to the second direction.

4. The audio device of claim 3, wherein an amount the first membrane moves in the first direction equals an amount the second membrane moves in the second direction.

5. The audio device of claim 1, further comprising:
- a first magnet positioned proximate to the first rear surface of the first membrane; and
- a second magnet positioned proximate to the second rear surface of the second membrane.

6. The audio device of claim 1, wherein a plane perpendicular to the first front surface of the first membrane includes a first reference point of the first membrane and a second reference point of the second membrane.

7. The audio device of claim 1, wherein a second reference point of the second membrane is offset from a plane perpendicular to a first front surface of the first membrane.

8. The audio device of claim 1, further comprising:
- an additional port positioned at an opposite end of the second front volume than the second port.

9. The audio device of claim 8, wherein the first port faces orthogonal to the second port and to the additional port.

10. A headset comprising:
- a frame;
- one or more display elements coupled to the frame, each display element configured to generate image light; and
- an audio device included in a portion of the frame, the audio device including:
  - a first membrane including a first front surface and a first back surface;
  - a second membrane including a second front surface and a second back surface, and the second front surface faces toward the first back surface;
  - a first front volume that includes a first port and is formed in part by the first front surface, and is configured to output first acoustic pressure waves generated by the first membrane via the first port;
  - a second front volume that includes a second port and is formed in part by the second front surface, and is configured to output acoustic pressure waves generated by the second membrane via the second port; and
  - a shared back volume that is formed in part by the first back surface and the second back surface and pressure within the shared back volume is configured to be isobaric.

11. The headset of claim 10, wherein the first port faces an opposite direction than the second port.

12. The headset of claim 11, wherein the first port faces a user wearing the headset and the second port faces a local area surrounding the headset.

13. The headset of claim 10, wherein the first membrane is configured to move in a first direction and the second membrane is configured to move in a second direction when the audio device outputs audio content, the first direction opposite to the second direction.

14. The headset of claim 10, wherein:
- a plane perpendicular to the first front surface of the first membrane includes a first reference point of the first membrane and a second reference point of the second membrane.

15. The headset of claim 10, wherein
- a second reference point of the second membrane is offset from a plane perpendicular to a first front surface of the first membrane.

16. The headset of claim 10, wherein the portion of the frame comprises an end piece of the frame.

17. An audio device comprising:
- a first membrane including a first front surface and a first back surface;
- a second membrane including a second front surface and a second back surface, the second front surface facing away from the first front surface so the first front surface and the second front surface face opposite directions;
- a first port in a volume formed by the first front surface of the first membrane and the second front surface of the second membrane and configured to output acoustic pressure waves generated by movement of the first membrane; and
- a second port in a back volume formed by the first back surface of the first membrane and the second back surface of the second membrane and aligned with the first port along an axis perpendicular to the first port and the second port, the second port configured to output acoustic pressure waves generated by movement of the second membrane.

18. The audio device of claim 17, wherein the first membrane is configured to move in an opposite direction than the second membrane when the audio device outputs audio data.

19. The audio device of claim 17, wherein an amount the first membrane moves in a first direction when the audio device outputs audio content equals an amount the second membrane moves in a second direction when the audio device outputs audio content, the first direction opposite to the second direction.

20. The audio device of claim 17, further comprising:
a magnet having a first side proximate to the first rear surface and a second side proximate to the second rear surface.

* * * * *